R. BAILEY.
SELF CLOSING RIGGING HOOK.
APPLICATION FILED JAN. 31, 1916.
1,248,596.
Patented Dec. 4, 1917.
Fig. 1.
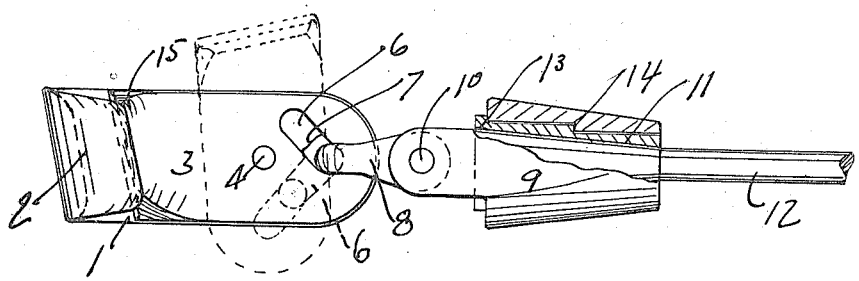
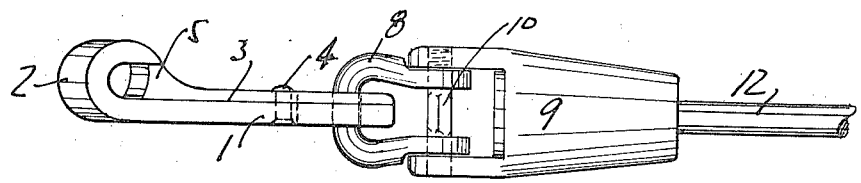
Fig. 2.
WITNESS
INVENTOR
Ray Bailey
BY
ATTORNEY

UNITED STATES PATENT OFFICE.

RAY BAILEY, OF GRANGER, WASHINGTON.

SELF-CLOSING RIGGING-HOOK.

1,248,596.          Specification of Letters Patent.      Patented Dec. 4, 1917.

Application filed January 31, 1916. Serial No. 75,280.

*To all whom it may concern:*

Be it known that I, RAY BAILEY, a citizen of the United States, and a resident of Granger, in the county of Yakima and State of Washington, have invented certain new and useful Improvements in Self-Closing Rigging-Hooks, of which the following is a full, true, and exact specification.

My invention relates to improvements in self closing rigging hooks, and has for its principal object to provide a cheap, simple, and novel automatically self closing hook for use in logging camps as a choker hook and the like. A further object is to provide a hook as briefly described above which embodies an improved swivel connection which requires a minimum of cable.

Another object is to provide a hook of such shape as to conform to the general natural direction of the cable when used in the form of a loop around a log.

In logging operations in the West, the logs are skidded along the ground by means of a long cable and an engine. The log is held by a short piece of cable with a hook on one end known as a choker hook. The choker is wrapped once around the log engaged in the hook, which is usually an open hook.

When the pulling line becomes loosened, the hook frequently drops the line and the log is released. Further, many hooks are broken by the cable working out near the point of the hook and straining the hook to a breaking point. Open hooks catch upon trees, stumps and the like, and are broken, lost and released frequently.

All of the above disadvantages are overcome in my hook which is light and strong.

Other objects will appear as my invention is more fully explained in the following specification, illustrated in the accompanying drawings and pointed out in the appended claim:

In the drawings Figure 1 is a plan of my hook and swivel with parts of the latter broken away. Fig. 2 is a side elevation of same.

In referring to the drawings Fig. 1 indicates the body or shank of a wide flat hook which has a turned up open hook 2 at one end. The hook is formed at an angle slightly greater than a right angle with respect to the longitudinal axes of the shank. A latch 3 is pivoted to shank 1 as at 4. The latch 3 fits closely to the face of the shank 1 and is provided with a formed outer end 5 which fits snugly between the shank of the hook and the point of the hook. The end of the latch is preferably concaved and rounded off at the corners to more nearly fit a cable. The shank 1 has a heart shaped opening or slot 6 positioned just back of pivot pin 5 and pointing toward the rear of the hook. A diagonal slot 7 is cut in latch 3 and coincides with that side of slots 6 which lies toward the longer side of the hook. On end of slot 7 terminates at the point of the heart shaped slot 6 on the longitudinal center line of the hook.

A clevis 8 passes through slots 6 and 7 and is pivoted to the ears of a cable socket 9 by means of a screw pin 10 which is removable. Socket 9 has an inner sleeve 11 within which the end of a cable 12 is fastened. The sleeve 11 is rotatable in the socket 9 and has bearing shoulders 13 and 14 which take the load. When the hook and latch are in the position as shown in Fig. 1 the tension on the clevis holds the latch against loosening due to the action of the clevis 8 and slots 6 and 7. When it is desired to open the latch the cable is slackened and the clevis pulled toward the short side of the hook which swings the latch out into the position as shown in dotted lines in Fig. 1. When the latch is open the cable may be slipped into the hook or removed therefrom. A pull on the clevis will immediately close the latch and hold it closed which retains the cable in the hook.

It will be noted that my hook is simple of construction, easily opened and self closing, and that there are no projections which will catch upon logs or stumps. Further the angularity of the end of the hook prevents putting a sharp bend in the cable where it passes through the hook.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

A hook comprising a flat body portion having one end rebent to form a diagonally disposed hook member, said body portion having an inclined slot near one end, said slot starting from a medial line drawn through the body portion and extending forwardly and downwardly therefrom, a latch having a flat body portion which fits against the flat surface of the flat body portion of the hook member and is formed on its outer end with a head which fits within the hook member, the edge of the head being diagonal and spaced from the diagonal wall of the bent portion of the hook member to form an opening for a cable, a pivot located in advance of the inclined slot to connect the two body portions together, the body portion of the latch having a diagonally disposed slot starting from a medial line drawn through the body portion of the latch and extending forwardly and upwardly therefrom, the inner ends of the two slots registering with each other, and a link engaging the slots, whereby when pull is exerted on the link, same will be exerted on the rear oppositely inclined walls of the slots and cause the latch to close the hook member.

RAY BAILEY.

Copies of this patent may be obtained for five cents each, by addressing the "Commissioner of Patents, Washington, D. C."